United States Patent

Stedman

[15] 3,700,799
[45] Oct. 24, 1972

[54] VIDEO GATE
[72] Inventor: Robert J. Stedman, China Lake, Calif.
[73] Assignee: The United States of America as represented by the Secretary of the Navy
[22] Filed: April 3, 1970
[21] Appl. No.: 25,477

[52] U.S. Cl. ..............................178/6, 178/DIG. 21
[51] Int. Cl. ..............................................H04n 7/02
[58] Field of Search............................178/6, DIG. 21

[56] References Cited

UNITED STATES PATENTS

| | | | |
|---|---|---|---|
| 3,518,318 | 6/1970 | Olson................. | 178/DIG. 21 |
| 3,448,271 | 6/1969 | Aldrich et al....... | 178/DIG. 21 |
| 3,320,360 | 5/1967 | Thompson.......... | 178/DIG. 21 |
| 3,257,505 | 6/1966 | Vanwechel......... | 178/DIG. 21 |
| 2,774,964 | 12/1956 | Baker et al.......... | 178/DIG. 21 |

OTHER PUBLICATIONS

Digitnized Optical Radar Collimation System Theory of Oper. Circuit Descrip, Oper. & Maintenance Director. R. J. Stedman NWC Chival Lake, Cal. December 1968.
Closed Circuit TV Tracking Error Detector R. J. Stedman Naval Weap Center Chival Lake, Cal. January 1969.

*Primary Examiner*—Richard Murray
*Assistant Examiner*—Barry L. Leibowitz
*Attorney*—R. S. Sciascia and Roy Miller

[57] ABSTRACT

A video gate generator for excluding the sensing of any target other than a target inside the gate generated by digitally sampling a portion of a television raster and producing an output gate comprising left and right boundaries and upper and lower boundaries for superposition on a TV monitor.

6 Claims, 10 Drawing Figures

VIDEO GATE

GOVERNMENT INTEREST

The invention described herein may be manufactured and used by or for the Government of the United States of America for governmental purposes without the payment of any royalties thereon or therefor.

BACKGROUND OF THE INVENTION

The video gate generator is intended for use with a tracking error detector which is an edge tracker that derives analog error voltages from digital target position offset information obtained from a closed circuit TV camera system. The tracking error detector was initially developed to provide digital tracking error data which, combined with digital data from position encoders in a high performance tracking mount, gives the true direction of a target. Ultimately the tracking error detector was used as a real time automatic tracking system. That is, the digital signals, converted to analog form to position the video gate, were also used to control the mount for automatic tracking.

PRIOR ART

Prior art devices have been developed to provide what might be referred to as tracking gates, such as those disclosed in U.S. Pat. Nos. 2,774,964 and 3,257,506. U.S. Pat. No. 2,774,964 discloses an automatic radar target tracking system in which received PPI radar video signals containing target information in polar coordinates are converted into television video signals representing information in rectangular coordinates by means of a suitable signal converter storage tube. Auxiliary circuitry actuated by television system horizontal and vertical drive signals generates a small target tracking area which is also displayed on the television monitor. The tracking area is manually positioned such that a selected target can be tracked is centered therein. As the target moves, appropriate video signals are coupled to the video amplifier, the output of which produces suitable wave signals, to cause the tracking area to automatically track the selected target. The generated target area appears on the television monitor as an intensification of its scanning beam while the selected target center appears as a further beam modulation.

U.S. Pat. No. 3,257,506 discloses a system for increasing the contrast or varying the detailed contrast of the television picture of an object in which the video signal derived by scanning an object is applied to the gate circuit controlled by signals such that it allows only those components of the video signal which correspond to a predetermined portion of the picture to pass. In effect, the apparatus generates a gate from which the control voltage is derived and the detailed contrast correspondingly improved.

DESCRIPTION OF THE PREFERRED EMBODIMENT

Figure 1:
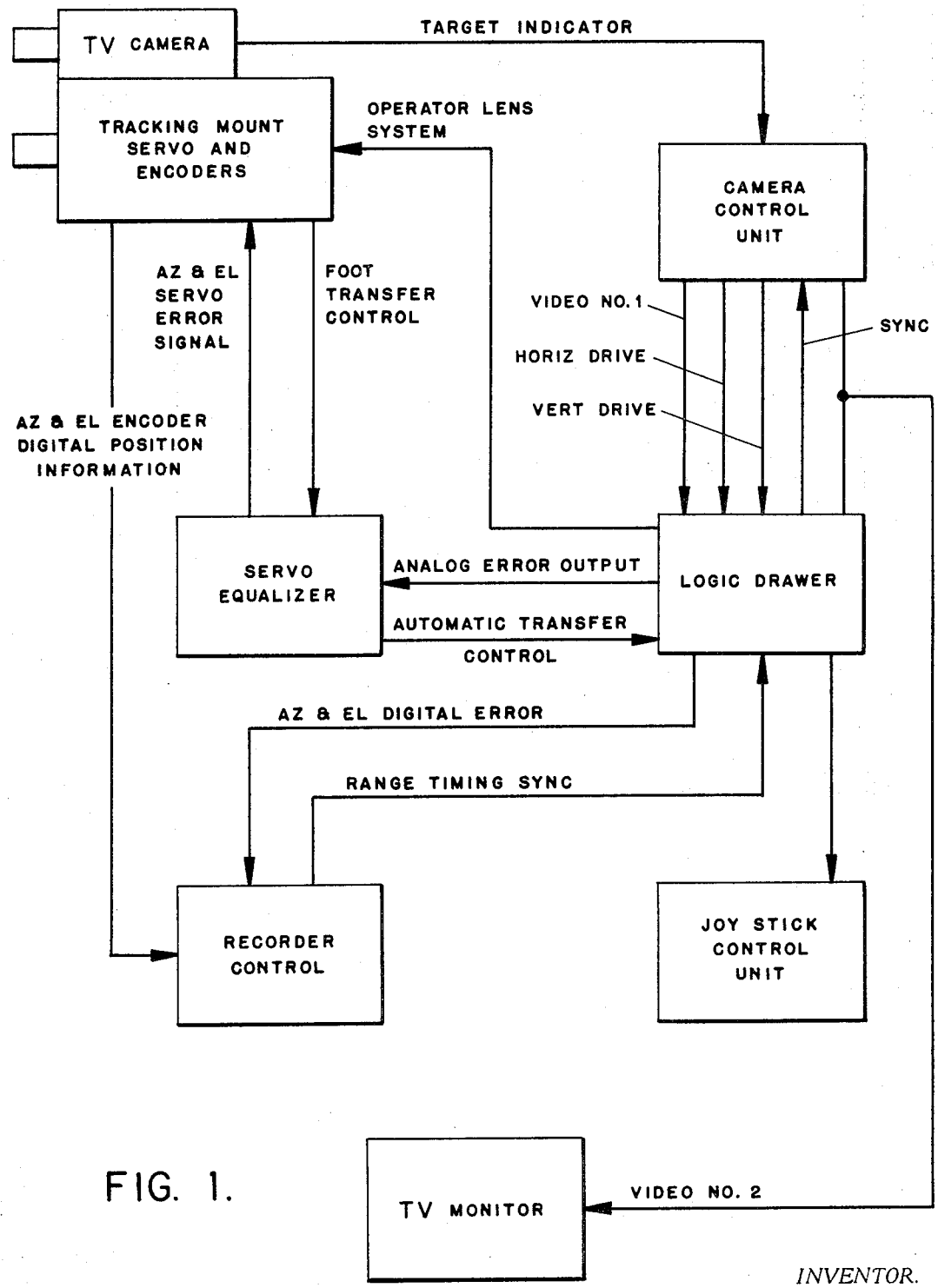
FIG. 1 is a block diagram of the target error detector.

FIG. 1 is a block diagram illustrating (in block diagram form) the tracking area detector installed and connected for operation. The TV camera sees the target through the lens and the resulting image is transmitted as a video signal to the camera control unit. The video No. 1 output of the camera control unit drives the video processing circuits in the logic drawer. The video gate from the video gate forming-and-positioning circuits in the logic drawer is inserted into video No. 2 and the gated video output is fed to the TV monitor. Video No. 2 is isolated from the video processing functions in the logic drawer to prevent sensing the inserted video gate as a target. The horizontal and vertical drive pulses are brought from the TV camera control unit into the logic circuitry to synchronize camera and tracking error detector sweeps.

The logic circuitry performs the following functions: (1) generation of a video gate which can be positioned for target acquisition and automatic tracking; (2) generation of digital data describing target position and analog drive signals for gate positioning and servo mount control; and (3) processing of the video signal for target recognition.

The digital output data are fed to the recorder control and the analog output is fed to the tracking mount servo system.

TARGET ACQUISITION

When the tracking error detector is to be used with a tracking mount to acquire a target for automatic tracking the following steps are performed:

1. boresight the sighting optics and the tracking error detector lens;
2. set the tracking error detector video gate for maximum size and with the joy stick, position the video gate about the center of the optical system;
3. set the tracking switch on the joy stick control unit to automatic;
4. set the contrast switch on the joy stick control unit for positive or negative use as desired; and
5. adjust the video control until no random target pulses appear inside the video gate.

The system is now ready to acquire a target. Using the mount tracking controls the desired target is positioned at the center of the sighting optics. At this time, the target should appear inside the video gate. With sufficient contrast a light will turn on in the operator's sighting optics, indicating a target. A switch is activated which then transfers to automatic tracking. In automatic tracking, the control of the video gate is transferred from the tracking error joy stick to the tracking error analog output, thereby allowing the video gate to be centered about the target automatically.

VERTICAL ERROR DETECTOR

Figure 2:
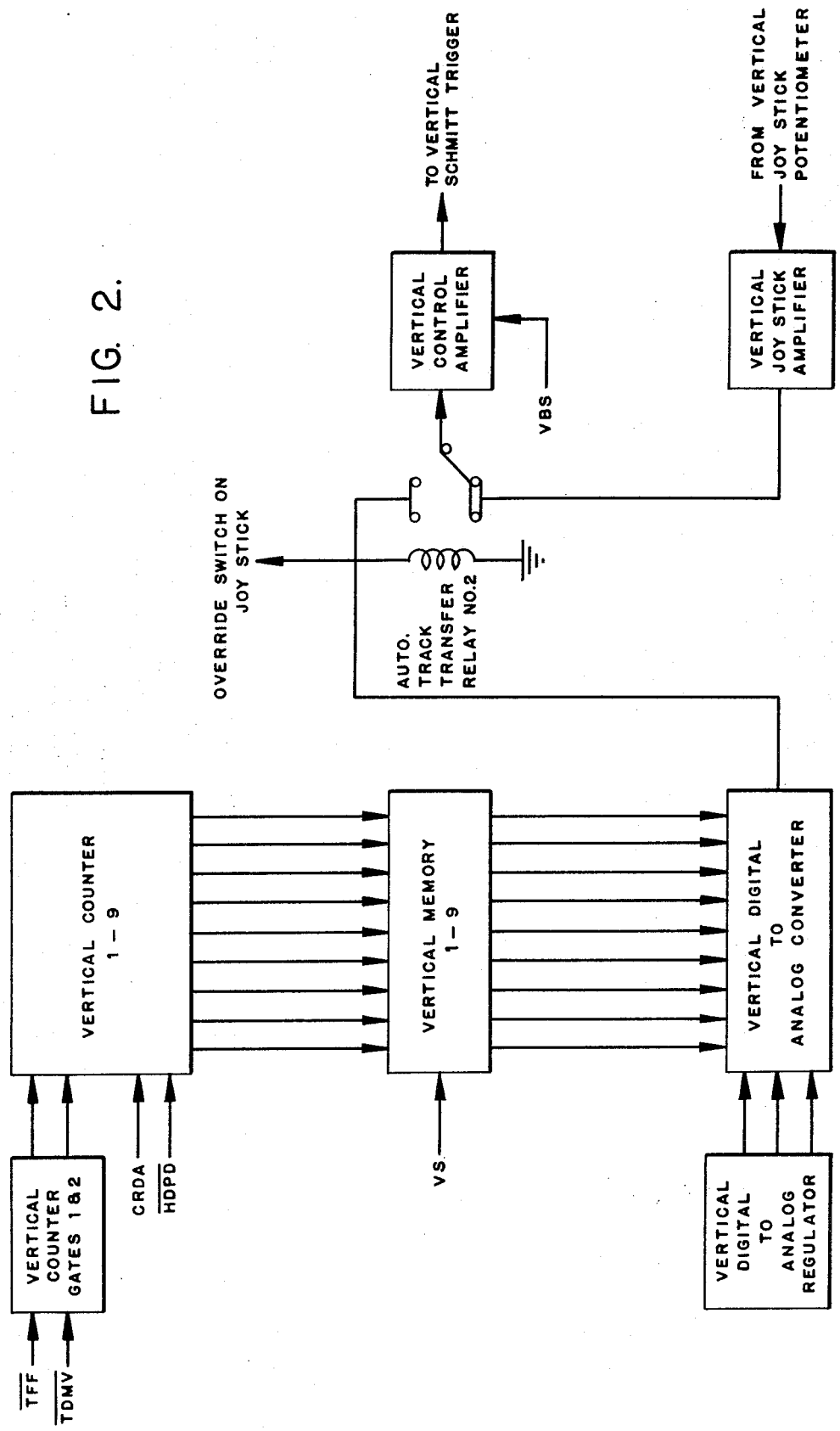
FIG. 2 is a block diagram of the vertical counter and memory.
Figure 3:
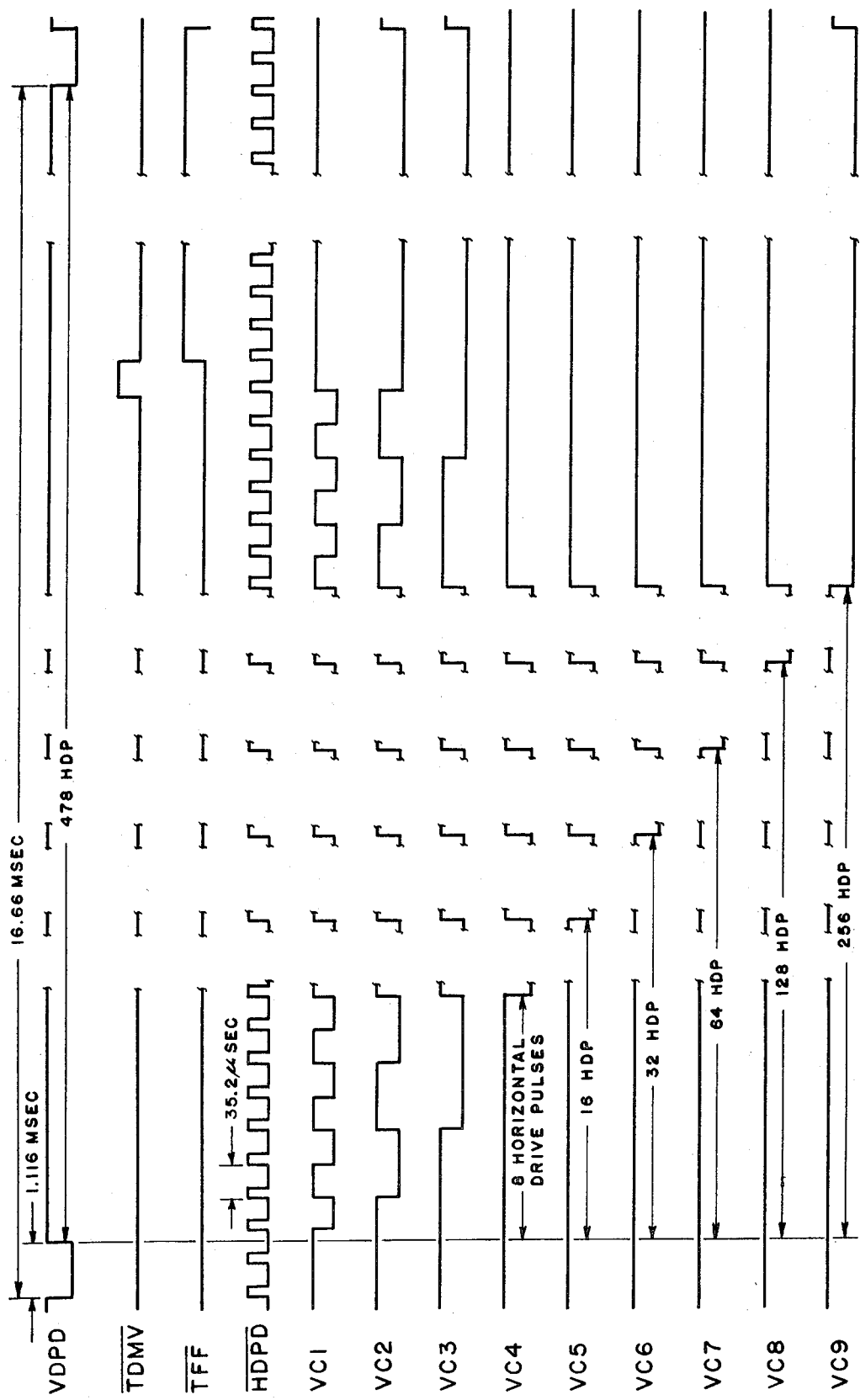
FIG. 3 illustrates vertical counter wave-forms.
Figure 6:
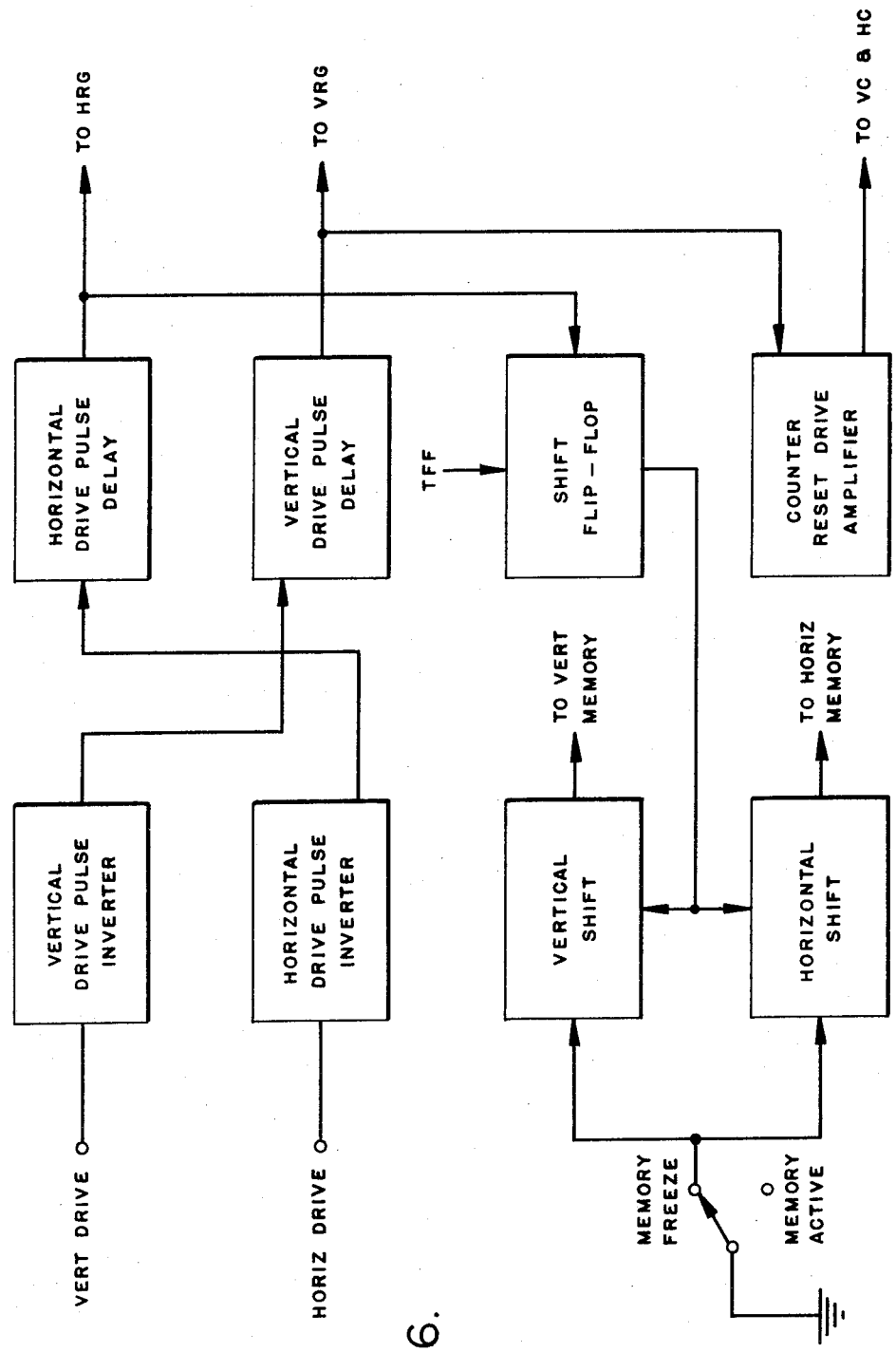
FIG. 6 is a block diagram of the internal sync counter.
Figure 7:
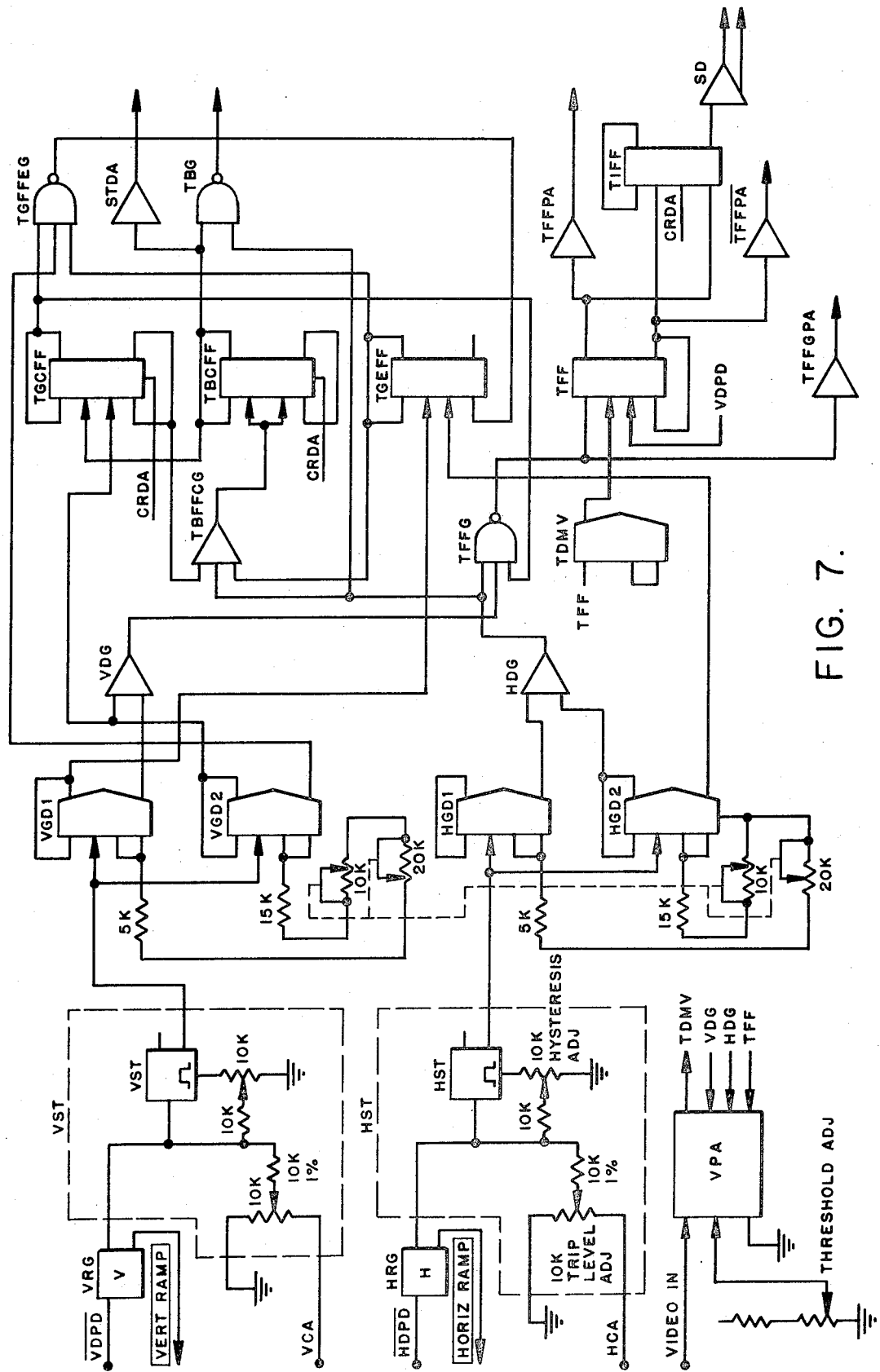
FIG. 7 is a logic diagram of the gate generator and video processing amplifier.

The vertical error counter (FIGS. 2 and 3) counts the digital location of the target inside the video gate by counting the horizontal TV lines. The count from the first line, after vertical blanking to the TV line on which a target is detected, provides the vertical location of the target. Inputs into the vertical error detector in memory are:

a. target flip-flop $\overline{TFF}$, FIG. 7;
b. horizontal drive pulse delay $\overline{HDPD}$, FIG. 6;
c. target delay multivibrator $\overline{TDMV}$, FIG. 7;
d. counter reset drive amplifier CRDA, FIG. 6;
e. vertical shift VS, FIG. 6;
f. vertical joy stick VJS, FIG. 1; and
g. vertical bias supply from VBS, not shown.

Initially, the vertical counter, VC1 through VC9, and $\overline{TFF}$ are reset at the trailing edge of the vertical blanking pulse from the counter reset drive amplifier CRDA. Inputs to vertical counter NAND gate 1 (VCG1), $\overline{TFF}$, $\overline{TDMV}$, and $\overline{VC1}$ are at logic 1, providing a set enable input to VC1. Vertical counter VC1 is triggered reset by $\overline{HDPD}$ and all inputs to VCG2 are at logic 1, providing a reset enable to VC1 which is triggered reset by the next $\overline{HDPD}$ pulse. In this manner, the binary counter, VC1 through VC9, accumulates $\overline{HDPD}$ pulses until TDMV (targe delay multivibrator) is triggered set with the detection of a target inside the video gate. When the target delay multivibrator is triggered set, $\overline{TDMV}$ goes to a logic zero and the set and reset enable inputs to VC1 are at a logic 1, holding VC1 disabled, thus terminating the count. Target flip-flop, TFF, is triggered set at the termination of TDMV delay time and $\overline{TFF}$ goes to a logic zero, holding the vertical counter disabled until TFF is reset by CRDA at the end of vertical blanking. $\overline{TFF}$ going to logic zero also sets the shift flip-flop, SFF. Reset of SFF by the termination of HDPD applies a vertical shift, VS, pulse to the vertical memory, VM1 – VM9, shifting the counter data into the relective memory stages.

The maximum number of horizontal drive pulse delay pulses the vertical counter can accumulate is determined by the equation:

Maximum vertical count
$$= \frac{16.666 \text{ msec.} - 1.116 \text{ msec.}}{35.2 \text{ } \mu\text{sec.}} = 441$$

where:
16.666 milliseconds = total vertical sweep time;
1.116 milliseconds = vertical blanking time;
35.2 microseconds = horizontal sweep time.

The vertical digital-to-analog converter, VDAC, is driven by the negation outputs of the vertical memory. The analog reference voltage for the vertical digital-to-analog converter (VDAC) is furnished by the vertical digital-to-analog regulator, VDAR. Bias voltage is furnished by the vertical bias supply, VBS (not shown). VBS and HBS comprise a conventional power supply.

The analog output range of the vertical digital-to-analog converter (VDAC) for a full-register count of 511 is −8 volts. Since the maximum output of the counter is 441, the maximum output voltage of the vertical digital-to-analog converter is determined from the equation:

$$E_o \text{ Maximum} = (-8 \text{ } v/511) \times 441 = 6.90 \text{ } v$$

where:

$(-8 \text{ } v/511)$ = voltage weight per count; and
411 = maximum vertical count.

The vertical digital-to-analog converter output range is 0 to −6.90 volts, decreasing from 0 to −6.90 volts for an increasing count.

The output range of the vertical joy stick (VJS), used for target acquisition, is the same as that of the vertical digital-to-analog converter (VDAC). The vertical bias voltage sets a positive bias level at the positive input to the vertical control amplifier, VCA, to obtain a bipolar output voltage. The vertical control amplifier is operated non-inverting with an output range of ±8 volts, which is used to position the video gate.

HORIZONTAL ERROR DETECTOR

Figure 4:
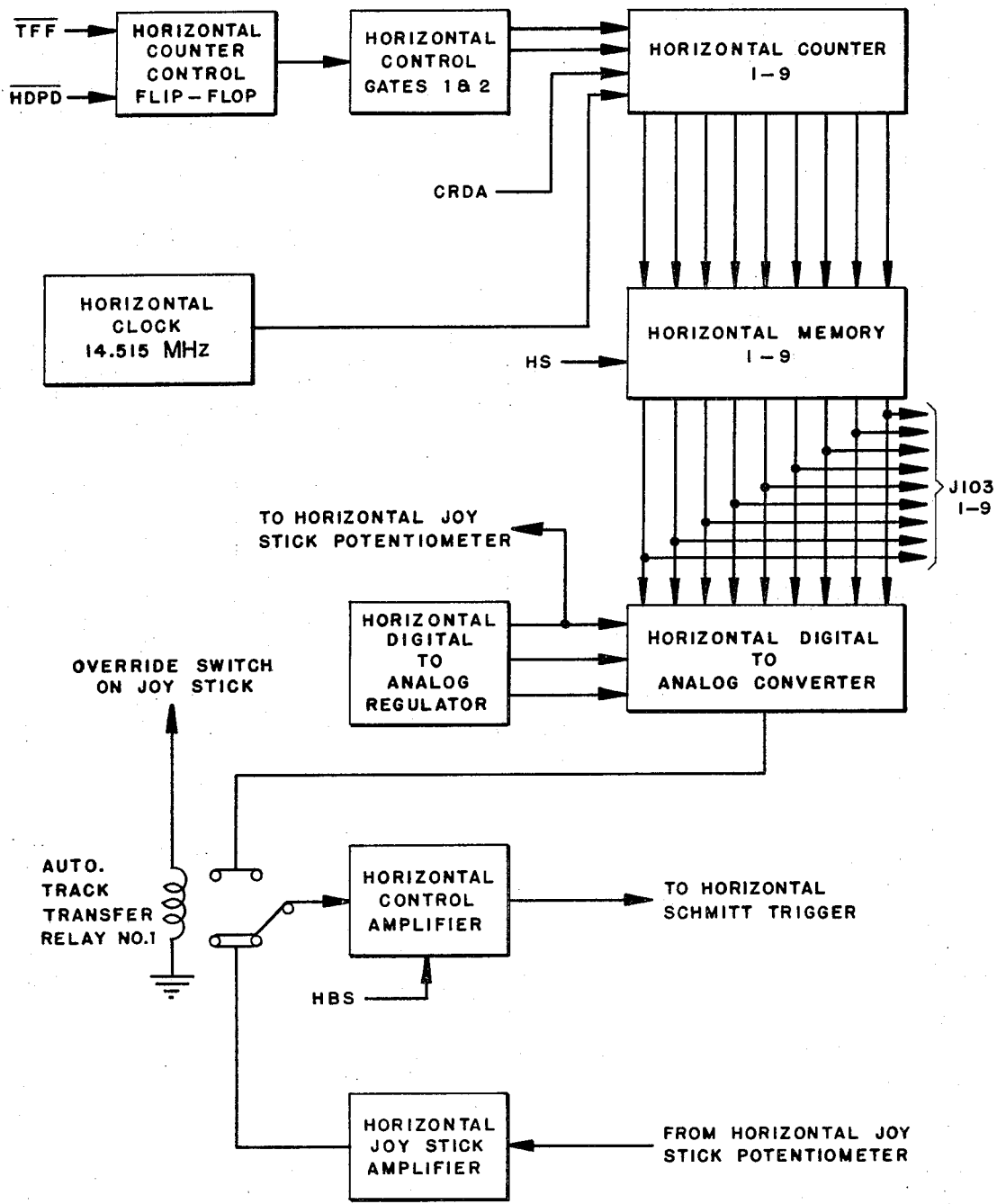
FIG. 4 is a block diagram of the horizontal counter and memory.
Figure 5:
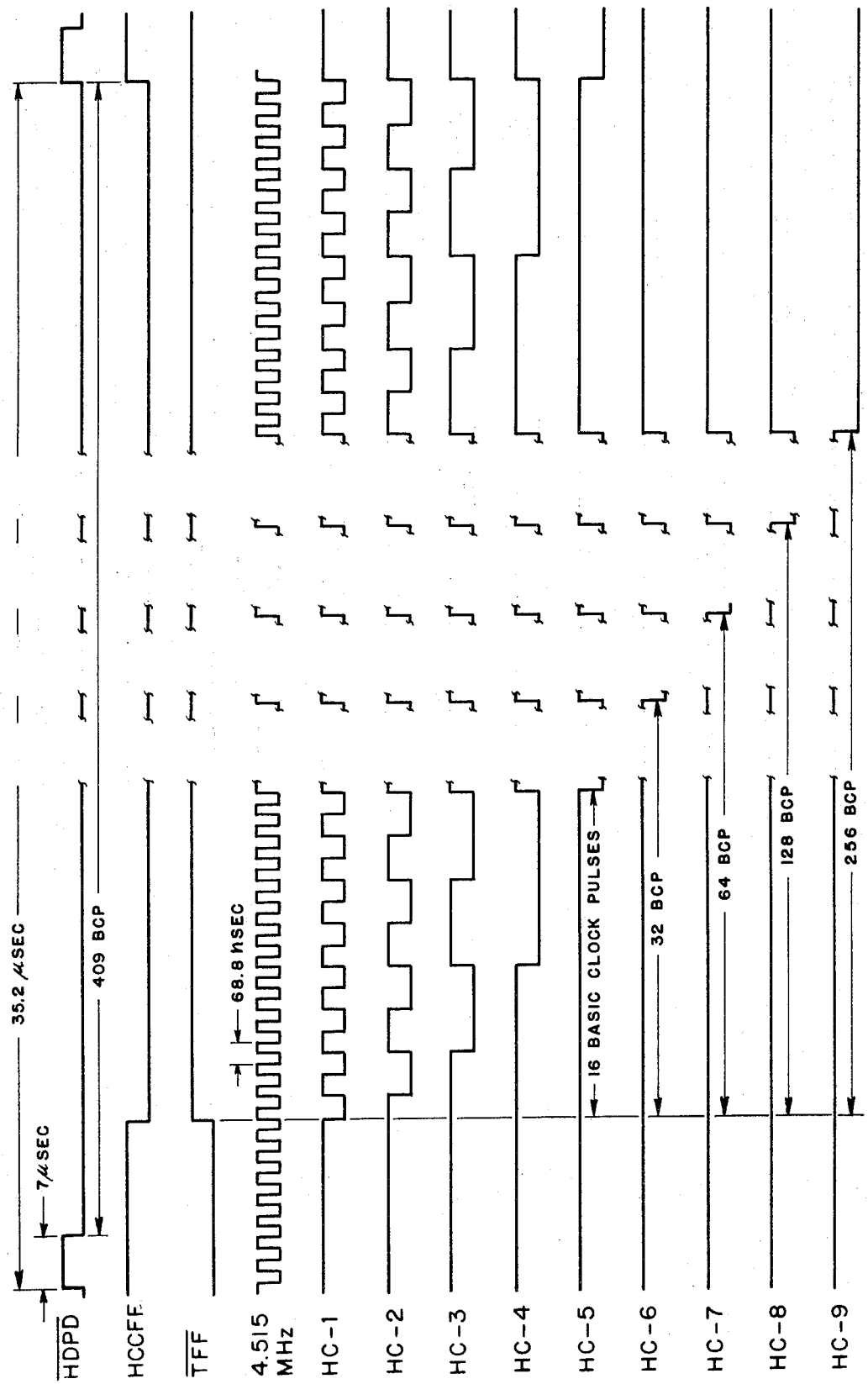
FIG. 5 illustrates horizontal counter wave-forms.

The operation of the horizontal error counter and memory, FIGS. 4 and 5, is similar to that of the vertical error counter memory. The horizontal counter is clocked by the horizontal clock crystal oscillator at 14.515 MHz; counting is initiated in the horizontal counter by set of the target flip-flop (TFF) and continues to the end of the TV line. Inputs to the horizontal error detector and memory are:

a. Target flip-flop, $\overline{TFF}$, FIG. 7;
b. Horizontal drive pulse delay, HDPD, FIG. 6;
c. Horizontal shift, HS, FIG. 6;
d. Counter reset driver amplifier, CRDA, FIG. 6;
e. Horizontal joy stick, HJS, not shown; and
f. Horizontal bias supply, HBS, not shown.

Initially, the horizontal counter stages HC1 through HC9 are in a reset state. When $\overline{TFF}$ goes to logic zero with the detection of a target pulse, the horizontal counter control flip-flop, HCCFF, is set. Both inputs to horizontal counter gate 1, HCG1, are at logic 1, producing a set enable, logic zero, to HC1. Horizontal counter HC1 is triggered set with the first clock pulse after TFF is set. With HC1 set, both inputs to HCG2 are at logic 1, producing a reset enable, logic zero, to HC1 which will be reset by the next clock pulse. The binary counter then continues to count clock pulses until disabled by HCCFF at the end of the TV line on which it was initiated. The logic zero from HCCFF disables HCG1 and HCG2, inhibiting HC1 and terminating the count. At the termination of HDPD, the shift flip-flop, SFF, goes to logic 0, which is applied to the trigger input of the horizontal memory via the horizontal shift, HS, pulse. The data accumulated by the horizontal counter are shifted into the respective memory stages HM1 through HM9. The horizontal counter stages (HC1 – HC9) are reset at the termination of VDPD.

The operation of the horizontal digital-to-analog converter, HDAC, horizontal digital-to-analog converter regulator, HDAR, horizontal joy stick HJS and horizontal control amplifier, HCA, differs from that of the vertical section only in output range and polarity. The horizontal digital-to-analog converter (HDAC) is driven from the assertion side of the horizontal memory, HM1 – HM9, and with no count accumulated, the output of the HDAC is −8 volts, increasing towards 0 volts with an increase in count. The maximum count that can be accumulated for a target located at the start of the horizontal sweep, at the extreme left edge of the monitor presentation, can be determined by the equation:

$$\text{Maximum count} = \frac{35.2 \text{ } \mu\text{sec.} - 7.0 \text{ } \mu\text{sec.}}{\frac{1}{14.515} \text{ MHz.}}$$

$$= 409 \text{ clock pulses}$$

where:
35.2 μsec = horizontal sweep time;
7.0 μsec = HDPD on time; and
14.515 MHz = clock frequency.

The analog output range of the HDAC with maximum count stored in the memory can be determined by the following equation:

$$E_o = -8v - (-8v/511) \times 409 = -1.60v$$

where:
−8 v/511 = voltage weight per count; and
409 = maximum number of pulse that can be accumulated by the counter.

The output voltage of the horizontal digital-to-analog regulator (HDAR) ranges from −8 to −1.60 volts.

The output range of the horizontal joy stick, HJS, used for target acquisition, is the same as that of the horizontal digital-to-analog converter, HDAC.

The horizontal bias voltage, HBS, provides a positive bias input to the horizontal control amplifier, HCA, to obtain a bipolar output voltage. The HCA is operated non inverting with an output of ±8 volts, which is used to position the video gate.

HORIZONTAL AND VERTICAL DRIVE PULSES

The camera control unit vertical and horizontal drive pulses are brought into the logic drawer of FIG. 1 and amplified and inverted in the vertical drive pulse inverter, VDPI, and horizontal drive pulse inverter, HDPI of FIG. 6. When received, the pulses are negative going, from 0 to −4 volts. At the outputs of the VDPI and HDPI, the pulses are positive going from −12 to 0 volts. Pulse width are 316.8 and 3.5 μ seconds, respectively. The $\overline{HPDP}$ output drives the vertical error counter, of FIG. 2 and the horizontal ramp generator, HRG of FIG. 7.

The $\overline{VDPD}$ output drives the vertical ramp generator, VRG of FIG. 7, and the counter reset drive amplifier, CRDA. The CRDA resets all counter flip-flops when $\overline{VDPD}$ goes to logic 1 at the termination of VDPD delay time.

When a target is detected within the video gate, $\overline{TFF}$ goes to logic 0 and triggers the shift flip-flop, SFF, set. At the end of HDPD delay time, SFF is reset by the horizontal delay pulse driver HDPD, going to logic 0. The output of the shift flip-flop, SFF, drives the vertical and horizontal shift, VS and HS, driver amplifiers. The vertical and horizontal memories are updated when SFF goes to logic 0 when triggered reset by the horizontal drive pulse driver, HDPD. The memory freeze-memory active switch also furnishes inputs to VS and HS. In the memory freeze position, the shift pulse is inhibited.

VIDEO GATE FORMING AND POSITIONING

Figure 8:
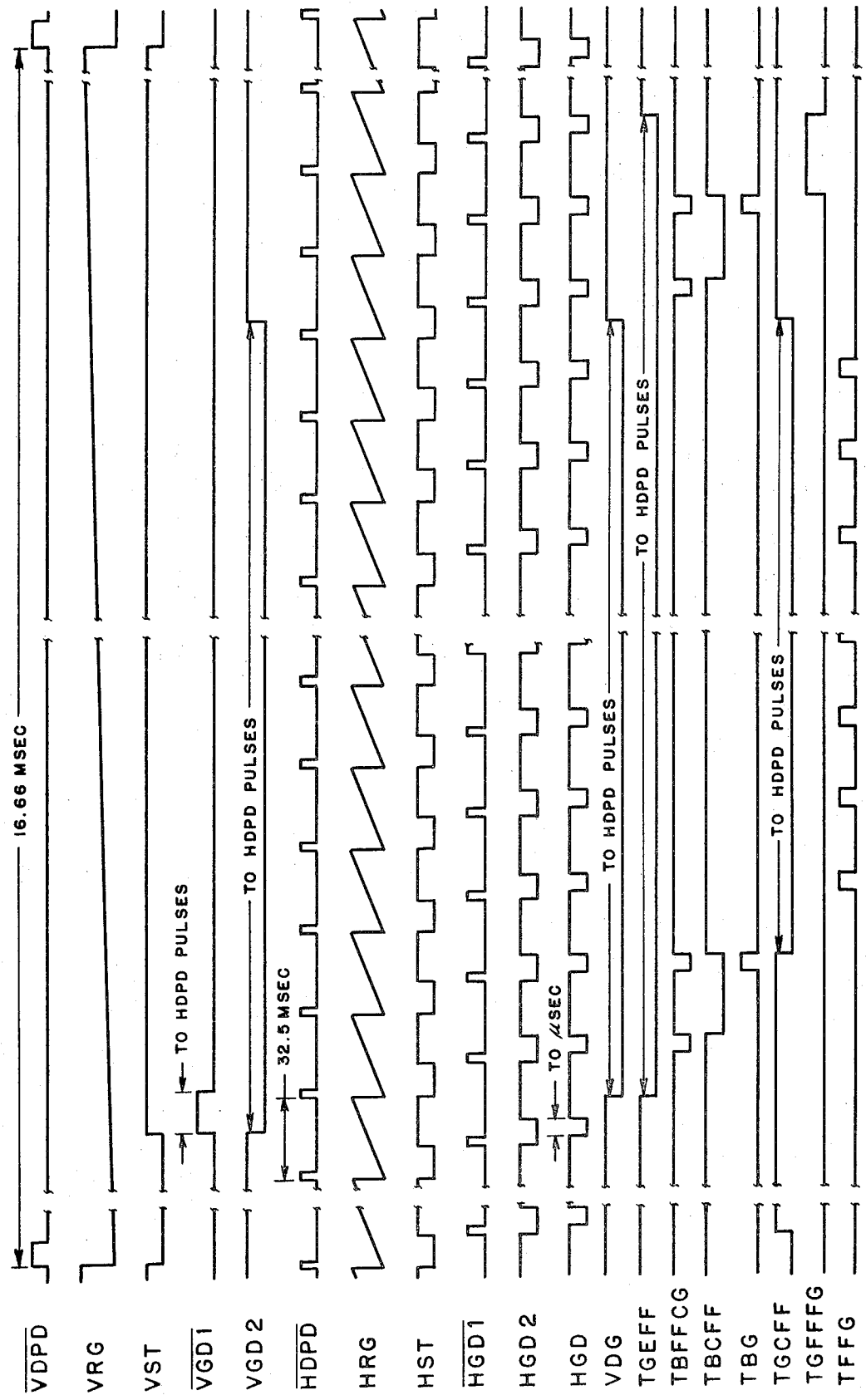
FIG. 8 illustrates video gate wave-forms.

The purpose of the video gate, which is rectangular in shape with the long dimension in the horizontal coordinate, FIGS. 7 and 8, is to exclude the sensing of any target not inside the gate. The gate is adjustable in size from 2 to 15 percent of the useable vertical and horizontal scanning times by using a panel mounted adjust control, not shown. Inputs to the gate-forming networks are:
 a. Vertical drive pulse delay, $\overline{VDPD}$, to the vertical ramp generator VRG;
 b. Vertical control amplifier, VCA, analog input to the vertical Schmitt trigger VST;
 c. Horizontal inputs $\overline{HDPD}$ and HCA to the horizontal ramp generator, HRG, and the horizontal Schmitt trigger, HST;
 d. Composite video signal from the TV camera applied to the video processor;
 e. An adjustable DC voltage from the joy stick control unit used to set the threshold level of the video processor.

When $\overline{VDPD}$ goes positive, to logic 0, the output of the vertical ramp generator (VRG) drops to −8 volts and thereafter generates a positive-going ramp which rises toward +8 volts. The negative excursion of the vertical ramp generator (VRG) triggers the vertical Schmitt trigger, VST, to logic 1. The input network to VST is a summing junction in which the ramp voltage is opposed by a voltage from the vertical control amplifier, VCA. When the two voltages are equal and of opposite polarity the vertical Schmitt trigger VST is turned off. Thus it can be seen that after the VST is triggered, it is held triggered by the vertical ramp. VST turn-off can be established at any point on the ramp by varying the input vertical control amplifier VCA voltage over the range of −8 to +8 volts. This feature allows the video gate to be positioned at any point between the bottom and top of the monitor screen.

When VST (vertical Schmitt trigger) is triggered with the termination of VRG, a logic 1 is applied to the trigger inputs of two one-shot multivibrators, vertical gate delays 1 and 2, (VGD1 and VGD2). At VST turn-off, both VGD1 and VGD2 are triggered. $\overline{VGD1}$ and VGD2 outputs are applied to the vertical delay AND gate VDG. The ganged four potentiometer gate adjust control is used to adjust gate size. Two of the potentiometers control the on times of VGD1 and VGD2 to control gate height; the other two potentiometers control the on times of HGD1 and HGD2 to control gate width. The potentiometer values are selected to provide a proportional variation of gate height and width.

Horizontal gate forming logic and vertical gate forming logic are similar. The main difference is in timing; the period of the VST is 16.666 milliseconds whereas the period of the HST is 35.2 microseconds. The horizontal ramp generator receives $\overline{HDPD}$ and produces HRG. The horizontal Schmitt trigger receives HRG and HCA and generates the horizontal timing trigger which, in turn, is fed to horizontal gate delays 1 and 2 (HGD1 and HGD2). The horizontal delay gate output is fed to the gate control logic and to the target enabling gate logic.

The logic described above determines the size of the gate. Additional logic is required to produce a rectangular area on the screen where video is not blanked and the target can be detected. This gate forming logic comprises:
 a. Top and bottom flip-flop, TBCFF;
 b. Top and bottom flip-flop control gate, TBFFCG;
 c. Top and bottom gate, TBG;
 d. Target flip-flop gate, TFFG;
 e. Target gate control flip-flop, TGCFF;
 f. Target gate flip-flop enable gate, TGFFEG; and
 g. Target gate enable flip-flop, TGEFF.

Gate forming logic proceeds as follows:
 a. TGCFF, TBCFF and TGEFF are initially in the reset state;

b. TGEFF which was triggered reset by the logic 0 from HDG2, is triggered set at the trailing edge of the vertical gate delay 1, VGD1, pulse, which provides enabling inputs to NAND gate TGFFEG and AND gate TBFFCG, both of which remain in the set state during the following steps.

c. TBCFF is toggled set through TBFFCG at the trailing edge of the first horizontal delay gate, HDG, pulse and is reset by the following HDG pulse;

d. During the time TBCFF is set, NAND gate 13 is enabled, allowing the second HDG pulse to pass. The second pulse to pass forms the top of the gate. TBCFF is reset at the trailing edge of the pulse that formed the top of the gate, triggering TBCFF set. $\overline{TGCFF}$ goes to logic 0, disabling AND gate TBFFCG, thereby inhibiting the input to TBCFF; and e. TGCFF going true enables NAND gates TGFFEG and TFFG.

Under the conditions set forth above, video data can be sensed on each horizontal sweep for the duration of the video gate enabling pulse.

True terms TGCFF and VDG enable NAND gate TFFG. When the horizontal delay gate produces an output pulse, the output of TFFG goes to logic 0, enabling the target flip-flop (TFF) to set. The output of target flip-flop gate power driver amplifier (TFFGPA) is applied to the video modulator drive amplifier of FIG. 9.

At the end of the VGD2 pulse, the vertical delay gate (VDC) and the target flip-flop gate (TFFG) are disabled, the target gate control flip-flop (TGCFF) is reset, AND gate top and bottom flip-flop control gate (TBFFCG) is enabled and the first HDG pulse through TBFFCG causes TBCFF to set, enabling TBG. The second HDG pulse out of TBG forms the bottom of the video gate.

The trailing edte of HDG resets the top and bottom control flip-flop, TBCFF, sets the target gate control flip-flop, TGCFF, disables top and bottom flip-flop control gate, TBFFCG, and prevents top and bottom control flip-flop, TBCFF, from toggling. When the TGCFF, VGD2 and TGEFF inputs to the target gate flip-flop enable gate, TGFFEG, are all at logic 1, the reset enable input of the target gate enable flip-flop (TGEFF) is enabled. When $\overline{HDGD2}$ is set again, the target gate enable flip-flop, TGEFF, is toggled reset, completing the gate forming for one field. FIG. 8 shows the vertical delay gate VDG enabled for maximum gate size, 15 percent of the useable screen height, or 33 horizontal lines.

During the time that HDG pulses are present at the output of the target flip-flop gate power amplifier, TFFGPA, any video target pulses present at the output of the video processor trigger TDMV and set TDMV. The trailing edge of the TDMV pulse, which is in coincidence with the real target on the next line, triggers the target flip-flop, TFF, set. The term TFF disables the target delay multivibrator (TDMV), preventing any additional triggering until the target flip-flop, TFF, is reset at the end of the field. The video output from the processing amplifier has a delay of approximately five basic clock pulses.

The video processing amplifier, VPA, processes all of the incoming video signals from the camera control unit of FIG. 1. The first stage is an operational amplifier connected as a differentiator with stop action to reduce high frequency noise inherent in differentiators and to prevent instability. The second stage is a conventionally connected operational amplifier that can be operated inverting or non inverting. Selection is made by energizing a relay through pressing the contrast selector switch (not shown) located on the joy stick control unit. This arrangement permits the selection of either positive contrast, black on white, operating inverted, or negative contrast, white on black, operating non inverted. The second stage drives a threshold detector that triggers on a positive pulse above a reference level set by the video potentiometer (not shown) located on the joy stick control unit. The threshold detector provides a constant output level and drives an inverting amplifier for an output compatible with the logic. The output stage is held at a logic level of 1 by a transistor in series with the output stage when biased off. When terms BDG, HDG and TFF are at logic 1, the series transistor is biased on, providing a path to ground for the output stage. During this time, if the video threshold triggers, the output goes to a logic zero, setting TDMV. Only the video signal that appears inside the video gate will be passed by the processor.

Drive amplifiers TFPPA and $\overline{TFPPA}$ prevent loading of the target flip-flop, TFF, output by the lower speed logic. When the target flip-flop is set, $\overline{TFF}$ going to logic zero:

a. Sets the horizontal control flip-flop, HCFF, which enables the horizontal counter;

b. Sets the target indicator flip-flop, TIFF; and c. Disables vertical counter NAND gates VCG1 and VCG2 thereby terminating the vertical count.

Figure 9:
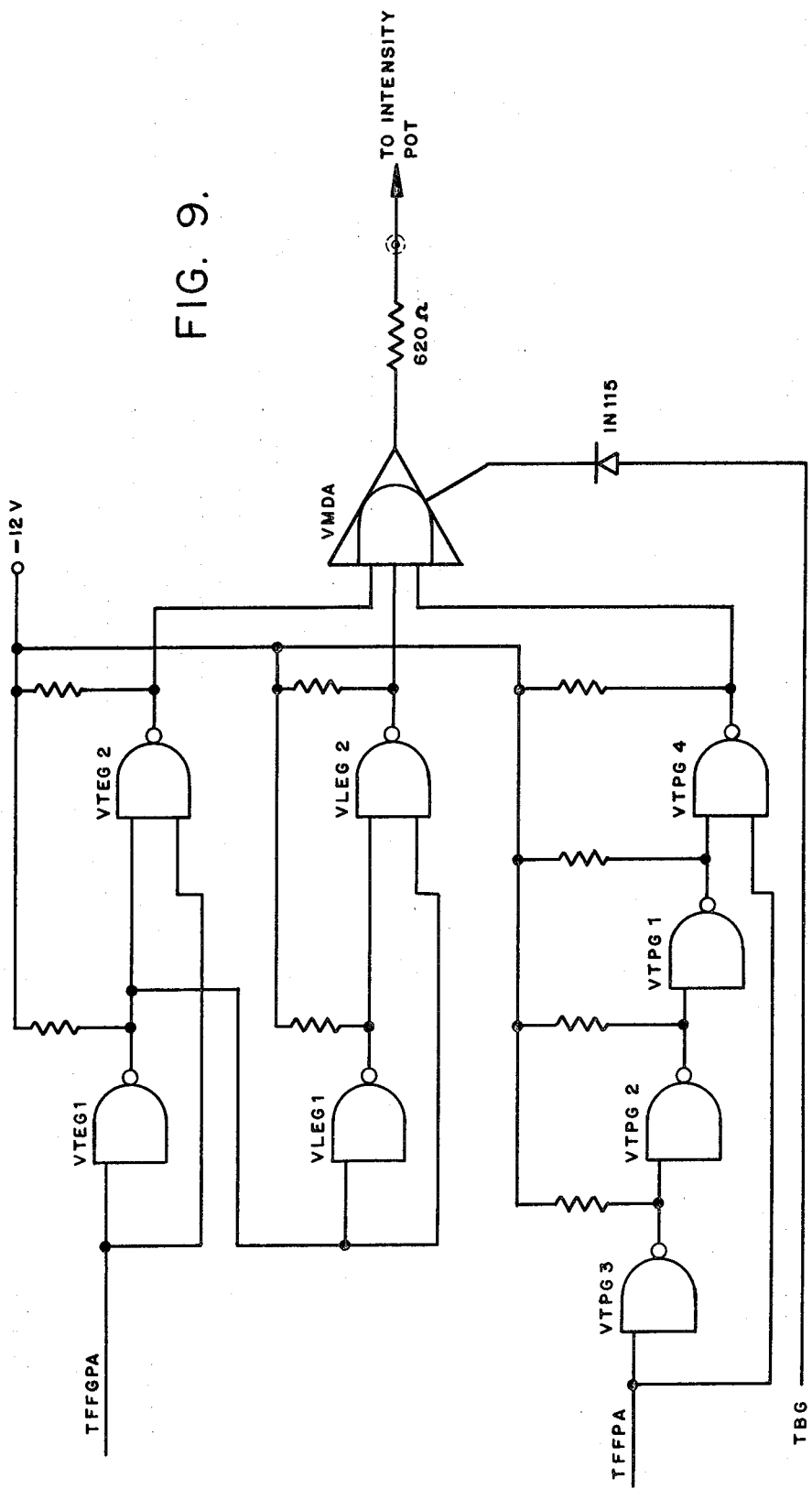
FIG. 9 is a logic diagram of the video modulator.

The true term of target flip-flop, TFF, is applied to the video modulator logic of FIG. 9 for insertion of a target pulse on the video signal and holds the target indicator flip-flop TIFF disabled. The target indicator flip-flop TIFF being set enables a solenoid driver (not shown) latching a relay and causing a light in the optical system to turn on, which informs the mount operator that a target is within the video gate and optical system data can be transferred to the tracking error detector. As long as there is a target present in each field, the target indicator flip-flop, TIFF, will remain set. With the loss of a target, the target flip-flop, TFF, will not set and the TIFF reset enable input is enabled by the target flip-flop, TFF, and will be reset by CRDA at the end of the field.

VIDEO MODULATOR

Figure 10:
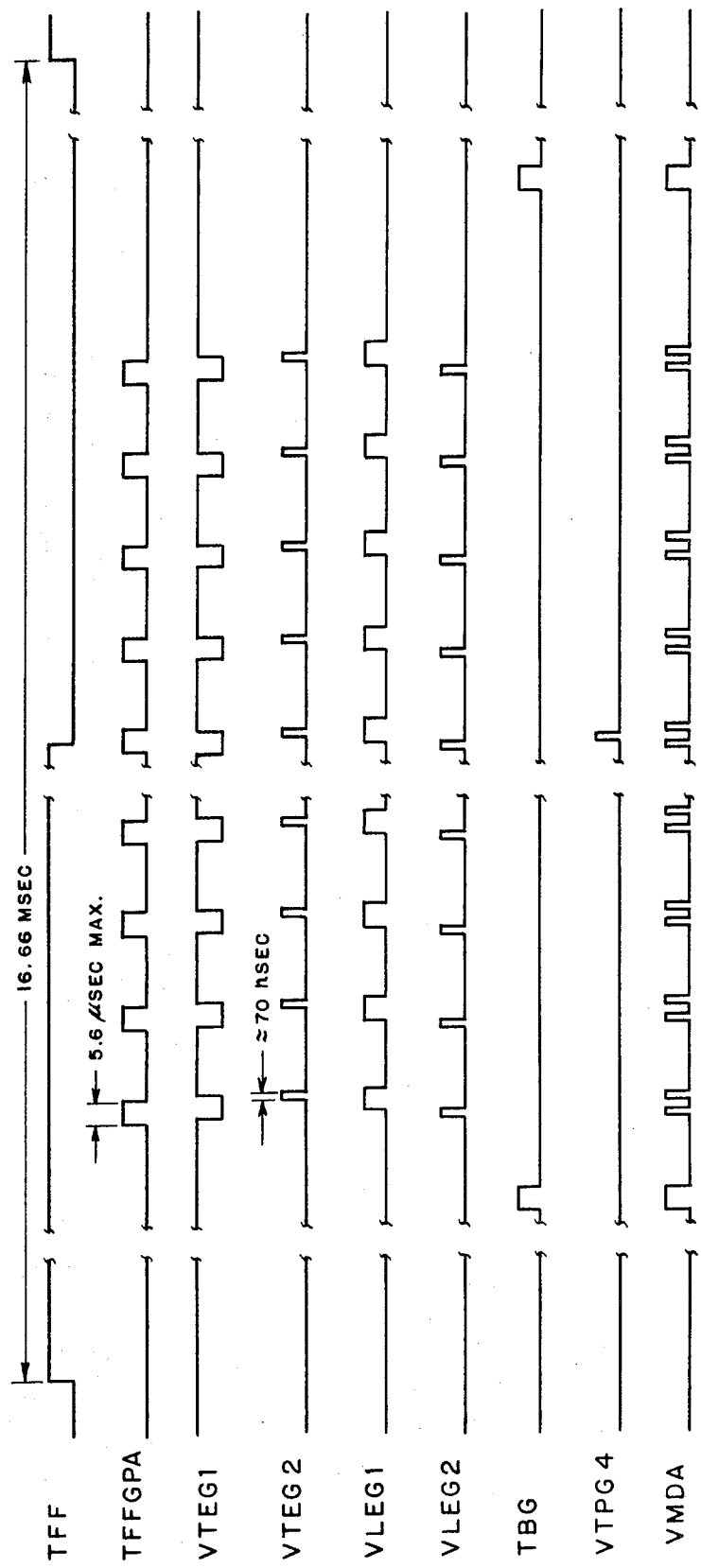
FIG. 10 illustrates video modulator wave-forms.

The video modulator, FIGS. 9 and 10, processes the video gate and target flip-flop, TFF, outputs for visual presentation on the TV monitor during target acquisition. Inputs to the video modulator are:

a. Target flip-flop power amplifier, TFFPA;

b. Target flip-flop gate power amplifier, TFFGPA; and c. Top and bottom gate, TBG.

The sides of the video gates are formed by using the difference between the turn on times of low speed, 2 MHz, and high speed, 8 MHz, NAND gates. The output of the target flip-flop gate power amplifier, TFFGPA, drives the video trailing edge gates 1 and 2, VTEG1 and VTEG2. The pulses from TFFGPA going to logic 0 cause VTEG1 to go to logic 1 and hold VTEG2 disabled. The output of VTEG1 also drives video leading edge gates 1 and 2, VLEG1 and VLEG2. High speed gate VLEG2 goes to logic 0 and low speed gate VLEG1 goes to logic 0 a finite time later, causing VLEG2 to return to logic 1. The output of VLEG2 is a narrow pulse, the duration of which is equal to the difference in turn on time between VLEG1 and VLEG2. These pulses appear as a series of dots on the left side of the monitor gate display. When the target flip-flop gate power amplifier TFFGPA goes to logic 1 with the termination of the video gate pulse, high speed gate VTEG2 goes to logic 0. Low speed gate VLEG1 goes to logic 0 a finite time later, disabling VLEG2 and causing VTEG2 to return to logic 1. The output of VTEG2 is a narrow pulse, the duration of which is equal to the difference in turn on time between VTEG1 and VTEG2. These pulses appear as a series of dots on the right side of the monitor gate display.

Video target pulse gates 1, 2 and 3 and 4 VTPG1 – 4, operate in a similar manner. Additional gates may be used to obtain wider pulses. When the target flip-flop TFF goes top logic 0, VTPG4 goes to logic 0. A finite time later, VTPG1 goes to logic 0, causing VTPG4 to return to logic 1 and produce an output pulse.

The outputs of VTEG2, VLEG2, VTPG4 and TBG drive expandable AND gate video modulator driver amplifier, VMDA. Whenever any one of its input functions goes to logic 0 the output of VMDA appears as a high white level on the TV camera video signal. The panel mounted square intensity potentiometer (not shown) and R9 limit the modulation voltage appearing on the video signal.

What is claimed is:

1. A video gate generator for providing a video gate which can be positioned for target acquisition and automatic tracking comprising:
    horizontal gate forming means for generating a left and right boundary on a display device;
    vertical gate forming means for generating an upper and lower boundary on a display device;
    gate adjust means operatively connected to the horizontal and vertical gate forming means for adjusting gate width and height respectively;
    the horizontal width and vertical height being less than the horizontal width and vertical height of the screen;
    a target flip-flop operatively connected to said horizontal and vertical gate forming means adapted to be set and reset by the outputs from said horizontal and vertical gate forming means and producing output pulses in response to input pulses thereto indicative of a target presence within said video gate;
    video processor means operatively receiving input video and connected to said horizontal and vertical gate forming means for processing the input video and outputting a video signal between said left and right boundaries and said upper and lower boundaries;
    the operation of said video processor being such as to only output video signals appearing within said gate.

2. A video gate generator as set forth in claim 1 and further including;
    vertical ramp generator means included in said vertical gate forming means;
    said vertical ramp generator receiving a vertical drive pulse from a TV camera included in the system;
    a vertical Schmitt trigger operatively connected to said vertical ramp generator and receiving the output from said vertical ramp generator;
    vertical error detector means;
    the vertical Schmitt trigger also receiving a vertical control pulse from the vertical error detector;
    said vertical error detector being operative to count the digital location of the target inside the video gate by counting the horizontal lines from the TV camera;
    the output of said vertical Schmitt trigger being coupled to said vertical gate forming means.

3. A video gate generator as set forth in claim 2 and further including;
    horizontal ramp generator means operatively receiving a horizontal drive pulse from the system TV camera;
    horizontal error detector means;
    horizontal Schmitt trigger means operatively receiving the output from said horizontal ramp generator and also receiving a horizontal control pulse from the horizontal error detector;
    the horizontal error detector being operative to count to the start of a target detection and continue the count to the end of a TV line;
    the output of said horizontal Schmitt trigger being coupled to said horizontal gate forming means.

4. A video gate generator as set forth in claim 3 and further including;
    a TV monitor;
    a video modulator for producing outputs corresponding to left and right lines and upper and lower lines operatively connected to said TV monitor;
    said video modulator receiving output pulses from the horizontal and vertical gate forming means and outputs from said target flip-flop; said TV monitor screen remaining blank except for the area inside said gate.

5. A video gate generator as set forth in claim 4 wherein said vertical error detector comprises;
    a vertical counter gate receiving pulses from target flip-flop and another input when a target is detected inside the generated video gate;
    a vertical counter connected to said counter gate and receiving the output therefrom;
    digital-to-analog converter means operatively coupled to the output of said counter for converting the digital signal therefrom to an analog signal;
    positioning amplifier means operatively receiving a signal corresponding to the position of the video gate; and
    vertical control amplifier means operatively receiving the output of said digital-to-analog converter and said positioning amplifier means and outputting a signal to said vertical Schmitt trigger.

6. A video gate generator as set forth in claim 4 wherein said horizontal error detector comprises;
    horizontal control means operatively receiving an inpur from said target flip-flop and another input when a target is detected within the video gate;

horizontal counter means operatively receiving the output of said horizontal control means;

horizontal digital-to-analog converter means operatively receiving the output said counter means for converting the digital output of said counter to an analog signal;

said horizontal digital-to-analog converter also receiving an analog signal corresponding to horizontal gate position; and horizontal control amplifier means operatively receiving the output of said horizontal digital-to-analog converter and outputting an analog signal to the horizontal Schmitt trigger.

* * * * *